United States Patent [19]

Brattan

[11] Patent Number: 5,021,199

[45] Date of Patent: Jun. 4, 1991

[54] SIEVE PLATE FOR EFFECTING GAS-LIQUID CONTACT AND STRUCTURE CONTAINING SIEVE PLATE

[75] Inventor: Keith Brattan, Great Boughton, England

[73] Assignee: Imperial Chemical Industries PLC, London, England

[21] Appl. No.: 444,431

[22] Filed: Dec. 1, 1989

[30] Foreign Application Priority Data

Dec. 2, 1988 [GB] United Kingdom ............... 8828223

[51] Int. Cl.⁵ .............................................. B01F 3/04
[52] U.S. Cl. .............................................. 261/114.1
[58] Field of Search ....................... 261/114.1, 114.3

[56] References Cited

U.S. PATENT DOCUMENTS

| | | | |
|---|---|---|---|
| 1,108,853 | 8/1914 | Sewell | 261/114.1 |
| 2,880,980 | 4/1959 | Bowles | 261/114.1 |
| 3,039,750 | 6/1962 | Kittel | 261/114.1 |
| 3,467,365 | 9/1969 | Webster | 261/114.1 |
| 3,475,134 | 10/1969 | Weber et al. | 261/114.1 |
| 3,914,347 | 10/1975 | Kors | 261/DIG. 39 |
| 3,983,191 | 9/1976 | Schauls | 261/114.1 |
| 4,118,285 | 10/1978 | Yeh | 261/114.1 |
| 4,547,326 | 10/1985 | Weiler | 261/114.1 |

FOREIGN PATENT DOCUMENTS

| | | | |
|---|---|---|---|
| 903447 | 2/1954 | Fed. Rep. of Germany | 261/114.1 |
| 2804680 | 8/1979 | Fed. Rep. of Germany | 261/114.1 |
| 886023 | 10/1943 | France | 261/114.1 |

*Primary Examiner*—Tim Miles
*Attorney, Agent, or Firm*—Cushman, Darby & Cushman

[57] ABSTRACT

A sieve plate for use in a structure in which direct contact may be effected between a gas and a liquid, the sieve plate having a plurality of channels within the plate leading from one surface of the plate to an opposite surface of the plate, in which the channels are so shaped as to provide in the channel within the plate a weir over which liquid must pass if it is to flow downwardly through the channel. Also, a structure comprising one or more such sieve plates.

9 Claims, 2 Drawing Sheets

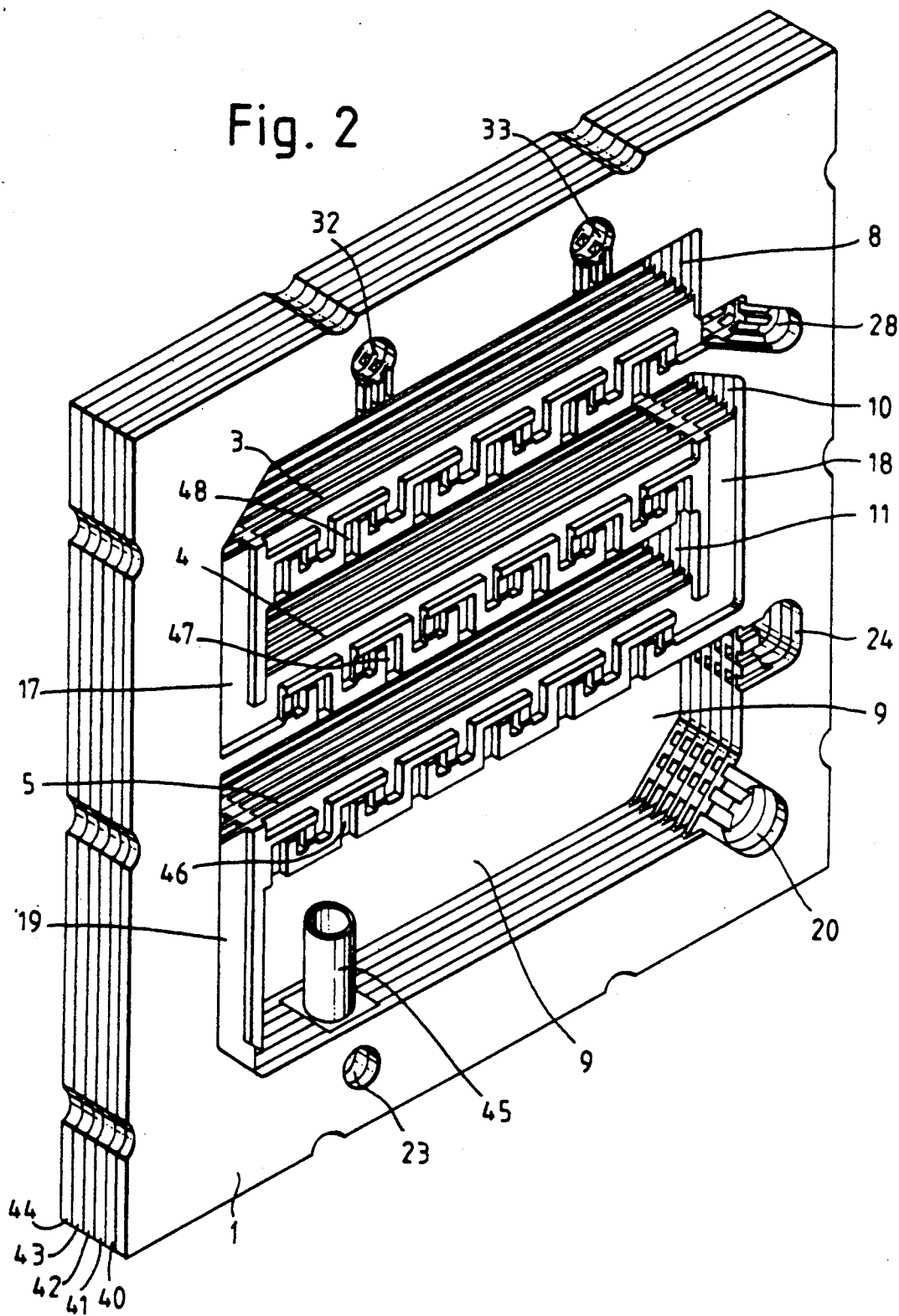

SIEVE PLATE FOR EFFECTING GAS-LIQUID CONTACT AND STRUCTURE CONTAINING SIEVE PLATE

This invention relates to a sieve plate for effecting direct contact between a gas and a liquid, and to a structure containing the sieve plate.

There are many processes in which directly, or indirectly, contact may be effected between a gas and a liquid. For example, a gas may be indirectly contacted with a cooling liquid in a heat-exchanger in order to cool the gas, and similarly a liquid may be cooled in such a heat-exchanger by effecting indirect contact with a cooling gas.

Direct contact may be effected between a liquid and a gas in order, for example, to dry the gas, or to cool the gas, or to absorb the gas in the liquid to form a solution therein, or to strip from the liquid a gas which is in admixture with the liquid, or to effect evaporation of the liquid. Such direct contact between a liquid and a gas may be effected in a number of different ways. For example, the gas may be bubbled through a pool of liquid, or streams of the gas and liquid may be contacted in a counter-current manner, for example by passing the liquid downwardly through a column and the gas upwardly through the column. The column may have plates therein, or it may be packed in order to effect intimate contact between the gas and the liquid.

One method of effecting direct contact between a gas and a liquid is by means of a sieve plate. A sieve plate comprises a plate having channels therein which lead from a lower surface of the plate to an upper surface of the plate. A number of such sieve plates may incorporated into a structure, for example into a column with the plates generally positioned one above the other, and in operation liquid is charged to an upper part of the structure and gas to a lower part of the structure, the gas passes upwardly in the structure through the channels in the plates where it contacts the liquid on the upper surfaces of the plates, and the liquid passes downwardly in the structure through suitably positioned downcomers.

In order that efficient contact may be effected between the gas and liquid it is desirable that in operation of such a structure at most only a small amount of the liquid should pass downwardly through the channels in the sieve plate, and preferably no liquid at all. However, in known sieve plates the channels in the plate pass directly through the plate from a lower surface of the plate to an upper surface of the plate and it is found in practice that the desired objective of having little or no liquid flow downwardly through the channels in the sieve plate, and also of achieving efficient contact between the gas and the liquid, may be achievable only over a narrow range of gas flow rates. At low gas flow rates outside the narrow range liquid may flow downwardly through the channels and at high gas flow rates outside the narrow range gas may pass so rapidly through the channels in the sieve plate and through the liquid on the upper surface of the plate that only poor contact between the gas and the liquid may be achieved. Indeed it may be necessary to control the gas flow rate very carefully to achieve the desired objective, or alternatively to use a sieve plate having channel dimensions, e.g. cross-sectional area, which are carefully chosen to suit the gas flow rate.

The present invention relates to a sieve plate having a plurality of channels therein which in operation results in improved contact between a gas and a liquid and little or no downward flow of liquid through the channels in the plate even over a substantial range of rates of gas flow.

According to the present invention there is provided a sieve plate having a plurality of channels within the plate leading from one surface of the plate to an opposite surface of the plate, in which the channels are so shaped as to provide in the channel within the plate a weir over which liquid must pass if it is to flow downwardly through the channel.

The sieve plate of the invention provides a relatively simple modification of the known type of sieve plate. However, the simple modification of having channels within the sieve plate between opposite surfaces of the plate and which comprise a weir over which liquid must pass if it is to flow downwardly through the channels, rather than having channels of known type which pass directly through the sieve plate between opposite surfaces of the plate, has a profound effect on the operation of the plate, and in particular it has the surprising effect that in operation of the plate to effect direct contact between a gas and a liquid there is little or no downward flow of liquid through the channels in the plate even over a substantial range of gas flow rates.

We are aware of bubble-cap type plates which comprise channels leading through a plate from a lower surface to an upper surface thereof and which terminate in an upstanding rim on the upper surface of the plate, and a cap positioned over each of the upstanding rims. In operation of such a bubble-cap plate the upstanding rims provide a weir over which liquid must pass if it is to flow downwardly through the channels in the plate. However, the sieve plate of the present invention is distinguished from such a bubble-cap plate in that it comprises a weir in the channel within the plate, it does not necessarily comprise caps on the upper surface of the plate at the upper ends of the channels, although it may comprise such caps, and it is of substantially simpler construction.

The invention also provides a structure in which direct contact may be effected between a gas and a liquid and which comprises one or more sieve plates of the invention, which in a structure comprising a plurality of sieve plates are positioned generally one above the other, means for feeding liquid to an upper part of the structure and for feeding gas to a lower part of the structure, means for removing gas from an upper part of the structure and means for removing liquid from a lower part of the structure, and one or more downcomers through which liquid may pass downwardly through the structure. The structure generally contains a sufficient number of downcomers for liquid to pass progressively downwards through the structure from one sieve plate to the sieve plate positioned immediately below. In operation of the structure of the invention gas is charged to a lower part of the structure and passes progressively upwards through the channels in the sieve plates in the structure and contacts liquid which has been charged to an upper part of the structure and which is present on the upper surfaces of the sieve plates, liquid passes progressively downwards through downcomers and on to the sieve plates and is removed from a lower part of the structure, and gas is removed from an upper part of the structure.

The sieve plate of the invention will generally be of planar form or of substantially planar form.

When the sieve plate is installed in the structure of the invention it will generally be positioned substantially horizontally and the opposite surfaces of the plate hereinbefore referred to will provide an upper surface and a lower surface on the plate, and for simplicity the opposite surfaces will hereafter be referred to as the upper and lower surfaces of the sieve plate.

The sieve plate comprises a plurality of channels therein and the number of channels in the plate, the spacing between adjacent channels, and the dimensions of the channels, will depend inter alia on the size of the structure in which the plate is installed, on the gas and liquid flow rates, and on the volumes of gas and liquid which pass through the structure per unit time. The man skilled in the art will be able to choose a suitable number of channels for the plate, a suitable distribution of channels, and suitable dimensions of the channels by means of reasonable trial and experiment.

The weir in the channel within the sieve plate may be provided by a U-shape in the channel or by an inverted U-shape. The sieve plate of the invention may be constructed by any suitable techniques. For example, a substantially planar plate may be machined to provide in the plate a plurality of channels leading from an upper surface to a lower surface of the plate the channels being so shaped as to provide a weir in the channels within the plate.

In an alternative embodiment, which is somewhat easier to construct, the sieve plate may be constructed in two or more sections each of which is substantially planar and each of which has suitably shaped channels and/or grooves formed therein such that when the sections of the plate are placed in face-to-face contact and, for example, bonded together, a sieve plate is produced which has a plurality of channels within the plate and a weir in the channels within the plate. In a preferred embodiment which is readily constructed the sieve plate is formed from a stack comprising a plurality of substantially planar plates which each comprise a frame part and a bridging part positioned between opposite sides of the frame part, in which at least some of the bridging parts of the substantially planar plates have a plurality of grooves in a face thereof such that, when the substantially planar plates are stacked together the bridging parts of the plates abut against each other and together form a sieve plate, the grooves in a bridging part forming together with a bridging part of an adjacent plate a plurality of channels which comprise a weir therein.

When a stack of substantially planar plates is assembled the planar plates will generally be substantially vertical and the bridging parts of the planar plates, and the sieve plate formed therefrom, will be substantially horizontal.

The bridging parts of the planar plates comprise a plurality of grooves in the faces of the bridging parts. Such grooves are readily constructed by any suitable machining technique, or, where the plate is made of a suitable material, eg a plastics material, the planar plate having grooves in a face of the bridging part may be produced by moulding of a suitable material. In the stack of substantially planar plates at least some of the bridging parts have a plurality of grooves in a face thereof. In the stack of planar plates all the bridging parts may have a plurality of grooves in a face thereof, or alternatively, some of the bridging parts of the substantially planar plates in the stack thereof may have planar faces, that is be ungrooved. In the stack of substantially planar plates the bridging parts of the plates abut against each other such that the grooves in a bridging part form together with a bridging part of an adjacent plate a plurality of channels which comprise a weir therein.

Where the sieve plate of the invention is formed in this preferred way from a stack of substantially planar plates as hereinbefore described the stack itself also forms a substantial part of the structure of the invention. The structure in which direct contact may be effected between a gas and a liquid and which comprises such a stack of plates is completed by providing means for feeding liquid to an upper part of the structure and for feeding gas to a lower part of the structure, means for removing gas from an upper part of the structure and means for removing liquid from a lower part of the structure, and one or more downcomers through which liquid may pass downwardly through the structure.

The means by which liquid may be charged to and by which gas may be removed from an upper part of the structure, and the means by which gas may be charged to and liquid may be removed from a lower part of the structure, may be provided by channels in the frame part of the planar plate. For example, the channels may comprise an aperture through the thickness of the planar plate and a slot or the like substantially at right angles to the aperture and leading from the aperture to an upper or lower part of the structure as required. In the structure comprising a plurality of substantially planar plates and apertures through the thickness of the plates these apertures may together form compartments lengthwise of the structure. The planar plates may comprise a plurality of such apertures in the frame part thereof forming in the structure a plurality of lengthwise compartments through which gas may be charged to and gas may be removed from the structure and through which liquid may be charged to and liquid may be removed from the structure. Not all of the substantially planar plates in the structure need to have slots or the like in the frame parts thereof substantially at right angles to the apertures through the frame parts.

The substantially planar plates may comprise a plurality of bridging parts such that in a structure comprising a stack of such plates the bridging parts form a plurality of sieve plates. In general, in the planar plate the bridging parts will be positioned one above the other such that the stack of such plates comprises a plurality of sieve plates positioned one above the other.

In a preferred form of the substantially planar plate the use of which leads to improved efficiency of contact between a gas and a liquid in the structure of the invention, the upper part of the bridging part of the plate comprises a groove along the length of the bridging part in a face of the bridging part. When a plurality of planar plates of this preferred form are formed into a stack, and the grooved bridging parts of adjacent plates abut against each other or against similar bridging parts to form a sieve plate, the grooves form a plurality of channels on the upper surface of the sieve plate. The presence of such a plurality of channels on the upper surface of the sieve plate serves to retain liquid on the surface of the plate and thus to effect improved contact between the liquid and a gas passing through the channels in the sieve plate.

The structure of the invention comprises suitably positioned downcomers through which liquid may pass downwardly in the structure. In the preferred embodiment of the structure formed in part of a stack of substantially planar plates this downcomer may be provided by a groove in the frame part of the plate which is formed into a suitable channel when the frame part of the plate abuts against the frame part of an adjacent plate in the stack of plates.

It is preferred that the substantially planar plate having at least one bridging part is completely planar as this aids in the production of a stack of such plates and of a structure containing such a stack which is free of leaks between adjacent plates in the structure.

The planar plate may have any suitable shape. For example it may be circular in shape, but it is conveniently rectangular in shape, eg of square shape. Where the planar plate is rectangular in shape the bridging parts of the planar plate are position between and bridge opposite vertical sides of the planar plate.

In the planar plate the bridging parts are preferably substantially horizontal.

The planar plate may be constructed by any convenient means, but the chosen means of construction will depend at least to some extent on the nature of the material from which the plate is constructed. Thus where the plate is constructed of a plastics material the plate may be moulded by plastics processing techniques, eg by injection moulding or by compression moulding in a suitably shaped mould. On the other hand the plate may be constructed by machining of a sheet. Machining is a suitable construction technique to use where the material of the plate is a plastics material, and also where the sheet is of a non-plastics material. For example, a planar sheet may be machined in order to form in the sheet a frame part and one or more bridging parts positioned between opposite sides of the frame part, and grooves may be formed in the bridging parts and optionally in the frame part by machining in order to form channels in the bridging part for passage of gas from a lower to an upper part of the structure and an optional channel or channels in the frame part to serve as a downcomer for liquid.

The material of construction of the planar plate and thus of the sieve plate will be determined inter alia by the gas and liquid with which the sieve plate is to come into contact during use of the structure of the invention. For reasons of ease of construction, and of ease of assembly of the plates into a stack for use in the structure, it is preferred that the material be a plastics material. The plastics material may be, for example, a polyolefin, eg polyethylene or polypropylene; a halogen-containing olefine polymer, eg polyvinyl chloride or polyvinylidene chloride; an acrylic polymer, eg polymethyl methacrylate; a polyester, eg polyethylene terephthalate; an acrylonitrile-butadiene-styrene polymer; or a fluorine-containing polymer, eg poly vinylidene fluoride, particularly where resistance to corrosion by the gas and liquid is required. A preferred plastics material which is resistant to corrosion by a variety of different gases and liquids is a chlorinated polyvinyl chloride.

The material of construction of the planar plate and thus of the sieve plate is not necessarily a plastics material. For example it may be a metallic material, e.g. steel or titanium, although use of such a material is not preferred as such a material is generally less easily shaped than is a plastics material.

The structure of the invention may comprise a stack formed of a plurality of planar plates. In the structure a plurality of planar plates may be positioned adjacent to each other, and the stack of planar plates material a plastics material, a metal, or indeed another type of material, provided the adhesive which is selected is suitable for use with the chosen material, solvent bonding and heat welding, which are suitable for use with most plastics material, will generally be unsuitable for use with metallic materials.

The structure of the invention in which direct contact is effected between a gas and a liquid may be used in many specific applications, some of which have already been referred to in this specification. The structure of the invention is particularly suitable for use in the treatment of chlorine gas or hydrogen gas produced by the electrolysis of an aqueous alkali metal chloride solution in an electrolytic cell. The treatment may be, for example, cooling, purification or drying of the chlorine or hydrogen, although the structure may be used to effect direct contact between many different gases and liquids.

BRIEF DESCRIPTION OF THE DRAWINGS

FIG. 2 is an isometric view of a stack of substantially planar plates of FIG. 1 for use in a structure of the invention, in the stack the bridging parts forming the sieve plates of the invention.

DETAILED DESCRIPTION OF THE PRESENTLY PREFERRED EXEMPLARY EMBODIMENT

The structure of the invention may be associated with an electrolytic cell, and where the electrolytic cell is of the filter press type formed of a plurality of plates, the structure is such that it may conveniently be attached directly to such an electrolytic cell. lower cavity 9 and two intermediate cavities 10 and 11. Each of the bridging parts 3, 4, 5 are of similar construction and one of the bridging parts only will be described in detail.

Figure 3:
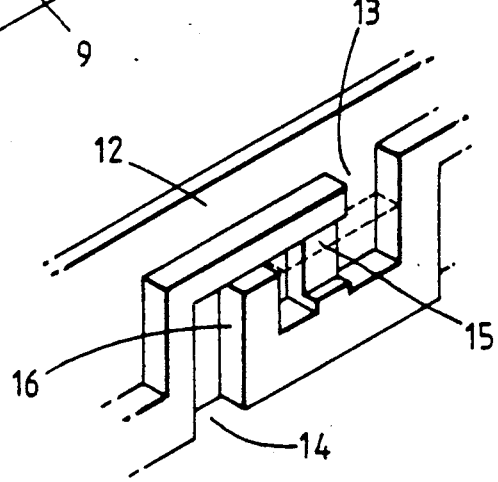
FIG. 3 is an enlarged view of that part of the planar plate of FIG. 1 indicated by letter A.

The bridging part 3 comprises a groove 12 in a face of the bridging part along the length of the upper part of the bridging part, and six shaped grooves leading form the lower part to the upper part of the bridging part. One only of these grooves will be described in detail. Each groove is formed in the face of the bridging part and each groove comprises an opening 13 in the upper part of the bridging part, an opening 14 in a lower part of the bridging part, and a connecting part 15 between the openings 13, 14. The aperture also features a weir 16 positioned at a level higher than that of the base of the connecting part 15 and over which liquid must pass in use if it is to flow through the aperture form the upper cavity 8 to the intermediate cavity 10. The height and the width of the connecting part 15 may be varied to achieve in use a designed gas pressure drop between the intermediate cavity 10 and the upper cavity 8. The maximum height of liquid within connecting part 15 during operation is shown in phantom lines in FIG. 3. The planar plate 1 also comprises a vertical groove 17 in a face of the plate in the vertical side 6 of the plate which groove leads from the upper cavity 8 to the intermediate cavity 10. The planar plate 1 comprises similar vertical grooves 18, 19 in the vertical sides 7 and 6 respectively of the plate which grooves lead respectively form the intermediate cavity 10 to the intermediate cavity 11 nd from the intermediate cavity 11 to the lower cavity 9.

The planar plate 1 comprises an aperture 20 through a frame part of the plate 1 and three slots 21, 22 and 22a in a face of the plate and at right angles to the aperture 20 and leading from the aperture 20 to the lower cavity 9. The planar plate 1 also comprises an aperture 23 through a frame part of the plate 1. The planar plate 1 comprises an aperture 24 through a frame part of the plate 1 and three slots 25, 26, 27 in a face of the plate and at right angles to the aperture 24 and leading from the aperture 24 to the lower cavity 9.

The planar plate comprises an aperture 28 through a frame part of the plate 1 and three slots 29, 30, 31 in a face of the plate and at right angles to the aperture 28 and leading from the aperture 28 to the upper cavity 8. The planar plate also comprises two apertures 32, 33 through a frame part of the plate and three slots 34, 35, 36 and three slots 37, 38, 39 in a face of the plate and at right angles to the apertures 32 and 33 and leading respectively from the apertures 32 and 33 to the upper cavity 8.

Figure 1:
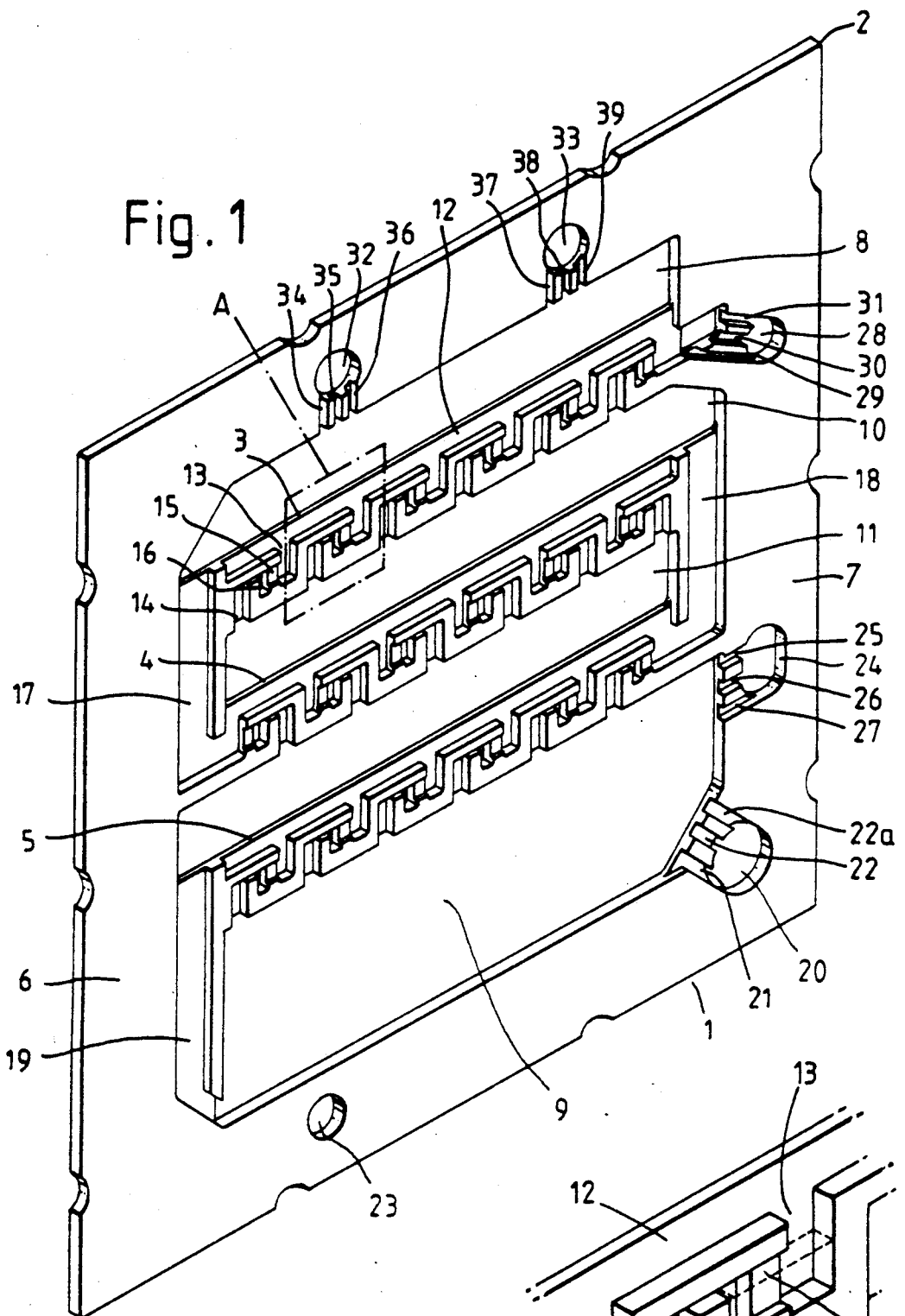
FIG. 1 is an isometric view of a substantially planar plate having three bridging parts each of which bridging part forms a part of a sieve plate of the invention.

Referring now to the embodiment shown in FIG. 2 the stack of substantially planar plates for use in structure of the invention comprises a plurality of planar plates 1, 40, 41, 42, 43, 44 each of the plates 40, 41, 42, 43, 44 having a construction which is essentially the same as that of planar plate 1 and differing in one respect only from that of plate 1, as will be explained hereafter. The same reference numerals indicated on FIG. 1 apply to the embodiment of FIG. 2 but for the sake of clarity some only of these reference numerals are shown in FIG. 2.

The plates in the stack of FIG. 2 are bonded together by means of an adhesive, and the stack comprises a stand pipe 45 which is positioned in suitably shaped slots in the plates 41, 42, 43, the stand pipe 45 leading from the lower cavity 9 to the aperture 23 in the plate 1 and similar apertures in the plates 40, 41, 42, 43, 44. It is in respect of this latter slot only in the plates 41, 42, 43 that these latter plates differ from the plate 1. In the structure the apertures 20, 23, 24, 28, 32, 33 in the plate 1 and similar apertures in the plates 40, 41, 42, 43, 44 together provide six separate compartments lengthwise of the stack. The structure of the invention is completed by end plates positioned at each end of the stack and which provide end walls for the structure, and in particular for the cavities 8, 9, 10, 11. For the sake of clarity these end plates have not been shown.

It will be appreciated that in the assembled stack the positioning together of like planar plates 1, 40, 41, 42, 43, 44 each having like bridging parts 3, 4, 5 forms from these bridging parts three sieve plate indicated as 49, 50, 51. Also, the grooves 12 in the upper parts of the bridging parts 3, 4, 5 of the planar plates are formed into a plurality of channels on the upper surfaces of each of the sieve plates. Similarly, the grooves in the faces of the bridging parts having openings 13, 14 and connecting part 15 form in the stack a channel having a weir 16 therein leading from a lower part of the bridging part to an upper part of the bridging part, the sieve plates 49, 50, 51 each comprising a plurality of such apertures, and the grooves 17, 18, 19 are formed into channels which act as downcomers leading from an upper cavity of the stack to an intermediate or lower cavity of the stack.

Operation of the structure of the invention will now be described with reference to FIG. 2 and with reference to the cooling of gaseous chlorine which has been produced by the electrolysis of aqueous sodium chloride solution. In order to aid the description the channels in bridging part 5 between a lower and upper surface thereof will be given reference numeral 46, the channels in bridging part 4 between a lower and upper surface thereof will be given reference numeral 47, and the channels in bridging part 3 between a lower and upper surface thereof will be given reference numeral 48.

The electrolytic cell, which is not shown, is of the filter press type and comprises a plurality of anodes and plurality of cathodes each anode being separated from an adjacent cathode by a cation-exchange membrane thereby dividing the cell into a plurality of anode compartments and a plurality of cathode compartments. In the electrolysis aqueous alkali metal chloride solution is charged to the anode compartments and water or dilute aqueous sodium hydroxide solution to the cathode compartments, the sodium chloride is electrolysed and hot chlorine and hot depleted aqueous sodium chloride solution are discharged from the anode compartments, the sodium ions liberated in the electrolysis are transferred by the cation-exchange membranes from the anode compartments to the cathode compartments in which they react with water to form sodium hydroxide and hydrogen, and hot hydrogen and hot aqueous sodium hydroxide solution are discharged from the cathode compartments.

Hot chlorine discharged from the anode compartments of the electrolytic cell is charged to the lengthwise compartment of which aperture 24 forms a part and thence through the associated slots 25, 26, 27 into lower cavity 9 of the structure.

The chlorine gas then passes progressively upwards through the structure via apertures 46 in sieve plate 51 and into intermediate cavity 11, via apertures 47 in sieve plate 50 and into intermediate cavity 10, and finally via apertures 48 in sieve plate 49 and into upper cavity 8.

Chilled aqueous sodium chloride solution from a reservoir thereof is charged to the lengthwise compartment of which aperture 28 forms a part and thence through associated slots 29, 30, 31 into upper cavity 8 of the structure. In the upper cavity the chilled solution fills the channels on the upper part of the sieve plate 49 formed by grooves 12, the solution passes through the downcomer formed by vertical groove 17 and into intermediate cavity 10 and fills the channels on the upper part of sieve plate 50 formed by grooves 12, the solution then passes through the downcomer formed by vertical groove 18 and into intermediate cavity 11 and fills the channels on the upper part of the sieve plate 51 formed by grooves 12, and finally the solution passes through the downcomer formed by vertical groove 19 and into lower cavity 9.

In operation of the structure of the invention the chlorine gas passes upwardly through the structure through the aperture 46, 47, 48 in the sieve plates 51, 50. 49 respectively and contacts the chilled aqueous sodium chloride solution in the cavities 11, 10, 8. The chlorine gas which passes to upper cavity 8 is cooled and is removed from cavity 8 via the lengthwise compartments of which apertures 32 and 33 form a part. The aqueous sodium chloride solution passes downwardly through downcomers 17, 18, 19 from upper cavity 8 to lower cavity 9 and the solution is progressively heated by contact with the chlorine gas.

Hot aqueous sodium chloride solution which has been discharged from the electrolytic cell is also charged to lower cavity 9 through the lengthwise compartment of which aperture 20 forms a part and the associated slots. In cavity 9 the hot aqueous sodium chloride solution discharged from the electrolytic cell is mixed with the aqueous sodium chloride solution which has been contacted with the chlorine and the mixed solutions are discharged from the structure through stand pipe 45 and the lengthwise compartment of which aperture 23 forms a part. The mixed solution may be returned to the anode compartments of the electrolytic cell for electrolysis, possibly after further purification and/or resaturation with sodium chloride.

I claim:

1. A sieve plate for use in a structure in which direct contact may be effected between a gas and a liquid, said sieve plate having a plurality of channels within the plate leading from one surface of the plate to an opposite surface of the plate, in which the channels are so shaped as to provide in the channel within the plate a weir over which liquid must pass if it is to flow downwardly through the channel and which is formed from a stack comprising a plurality of substantially planar plates each of which comprises a frame part and a bridging part positioned between opposite sides of the frame part, in which at least some of the bridging parts of the substantially planar plates have a plurality of grooves in a face thereof such that, when the substantially planar plates are stacked together the bridging parts of the plates abut against each other and together form a sieve plate, the grooves in a bridging part forming together with a bridging part of an adjacent plate a plurality of channels which comprise a weir in said sieve plate.

2. A sieve plate as claimed in claim 1 which is of substantially planar form.

3. A sieve plate as claimed in claim 1 or claim 2 in which the channels within the plane have a U-shape or an inverted U-shape.

4. A structure in which direct contact may be effected between a gas and liquid and which comprises one or more sieve plates as claimed in claim 1, and means for feeding liquid to an upper part of the structure and for feeding gas to a lower part of the structure, means for removing gas from an upper part of the structure and means for removing liquid from a lower part of the structure, and one or more downcomers through which liquid may pass downwardly through the structure.

5. A plurality of sieve plates as claimed in claim 1 in which the substantially planar plates comprise a plurality of bridging parts which in a stack of said planar plates are formed into a plurality of sieve plates.

6. A plurality of sieve plates as claimed in claim 5 ion whcih the bridging parts of the substantially planar plates are positioned one above the other such that in a stack of said planar plates the sieve plates are positioned one above the other.

7. A sieve plate as claimed in claim 6 in which the upper part of the bridging part of the substantially planar plate comprises a groove along the length of the bridging part in a face of said bridging part.

8. A sieve plate as claimed in claim 7 in which a plurality of said substantially planar plates are bonded together in the form of a stack of said plates.

9. A sieve plane as claimed in claim 8 in which the substantially planar plates are bonded together by means of an adhesive.

* * * * *